Oct. 7, 1924.

D. L. LINDQUIST ET AL 1,511,083

MEANS FOR OPERATING ELEVATORS AND GATES

Filed Feb. 18, 1921    6 Sheets-Sheet 3

Oct. 7, 1924.

D. L. LINDQUIST ET AL 1,511,083

MEANS FOR OPERATING ELEVATORS AND GATES

Filed Feb. 18, 1921

Patented Oct. 7, 1924.

1,511,083

UNITED STATES PATENT OFFICE.

DAVID L. LINDQUIST, OF HARTSDALE, NEW YORK, CLIFFORD NORTON, OF ORANGE, CLARENCE F. ENGLE, OF MONTCLAIR, NEVILLE S. DICKINSON, OF GLEN RIDGE, AND RUMSEY W. SCOTT, OF MONTCLAIR, NEW JERSEY, ASSIGNORS TO ELEVATOR SUPPLIES COMPANY, INC., A CORPORATION OF NEW JERSEY, AND OTIS ELEVATOR COMPANY, A CORPORATION OF NEW JERSEY.

MEANS FOR OPERATING ELEVATORS AND GATES.

Application filed February 18, 1921. Serial No. 446,120.

*To all whom it may concern:*

Be it known that we, DAVID L. LINDQUIST, CLIFFORD NORTON, CLARENCE F. ENGLE, NEVILLE S. DICKINSON, and RUMSEY W. SCOTT, citizens of the United States, with the exception of DAVID L. LINDQUIST, who is a subject of the King of Sweden, residing, respectively, at Hartsdale, county of Westchester, and State of New York; Orange, county of Essex, and State of New Jersey; Montclair, county of Essex, and State of New Jersey; Glen Ridge, New Jersey; and Montclair, county of Essex, and State of New Jersey, have invented certain new and useful Improvements in Means for Operating Elevators and Gates, of which the following is a clear, full, and exact description.

Our invention relates to mechanism for operating and controlling elevator cars and gates, and our object is to improve and simplify the construction.

One of the objects is to provide gate operating mechanism in connection with and in part controlled by an automatically leveling elevator by which the gate or gates shall be opened automatically, i. e., without the car operator having to press a button or switch as the car arrives at the floor in order to start the gate, and only at the floor at which the car is to stop. When an automatically leveling elevator is used, it is desirable that the gates shall be opened only when the car has slowed down and is within the operative zone of the automatically leveling mechanism.

In the drawings we have illustrated our invention as applied in connection with an elevator of the "push button" type, in which the car may be started from a floor and sent to and stopped at another floor automatically, except by the pressure of a button corresponding to the floor at which it is to stop. It will be obvious, however, that types of elevators which are manually controlled may be employed with some features of our invention.

In the embodiment of our invention illustrated, we have provided an elevator combined with so-called "micro-leveling" mechanism which cannot operate unless the main hoisting motor leaves the car within the micro-zone and which operates automatically, i. e., it will, when started, move the car toward the floor in whichever direction is necessary and bring it to rest at the floor level without the operator having to "jockey" it up and down to level position by the main hoisting motor. This particular feature by itself is not new, as such elevators have been in use heretofore. In the embodiment illustrated we have shown the micro-leveling mechanism as thrown into operation by, i. e., as a consequence of, cutting off the power of the main hoisting motor.

Heretofore in the practical operation of elevators, particularly where the principle of "safety first" has been desired, it has been the accepted practice to leave the gates closed until the elevator actually comes to a stop at the landing, and many constructions have been suggested to prevent the operation of the gates until the car has come to rest. This loses considerable time, particularly if the elevator operator is unable to stop his car exactly level with the floor, as is usually the case, and then has to move it to the floor level. All this takes time and, particularly with a fast running elevator, adds very materially to the total amount of time consumed for a trip, which is a serious disadvantage in passenger elevator service. In freight elevator service the question of time is not usually so material, but it is important, particularly where heavy trucking onto the elevator is employed, that the car floor shall always be level with the floor landing, as a slight variation in level of the two would be impractical for various reasons. Heavy-service elevators are ponderous, and the difficulty of bringing them to the proper level and maintaining them there brings in increased difficulties as compared with a relatively light passenger car. The gates also are wider, and, in the case of a fire-wall gate which is of metal and heavy, are difficult to control. By our construction all these difficulties are avoided whether in a passenger or freight elevator. In the preferred embodiment, after the power of the main hoisting motor is cut off, or substantially so, in order to stop at a floor, the operation of the gates is, preferably, entirely automatic. So long as the car floor is above or below, but within a short predetermined distance (8 inches, for example) of the floor landing, the gate automatically starts to open and the car to level itself, and by the time the "micro"-leveling construction has brought the car floor to a proper level the gate is fully open or substantially so.

The foregoing are some of the advantages obtained by our invention. We realize that all these results are not necessary in carrying out some of the features herein claimed, and we therefore do not limit ourselves to the preferred embodiment herein disclosed.

In the preferred embodiment illustrated in the drawings, Fig. 1$^a$ is a detail. Figs. 2, 3, 4 and 5 are simplified diagrams. Fig. 3$^a$ is a detail.

In the drawings we have illustrated an elevator hatchway in which runs a car serving three floors. From the car 1 (Figs. 6 and 7) run cables 2 passing around the usual hoisting drum 3 which is rotated by a main hoisting motor 6, Fig. 1. This is in the present instance a motor of the three-phase squirrel-cage-rotor type. For clarity of illustration, the means for automatically and properly accelerating the motor after the current has been turned on, and of gradually reducing the current before the time when the motor circuit is broken, have been omitted as unnecessary to the understanding of the invention. The motor is also provided with a solenoid-operated brake 5 energized when the brake is to be lifted.

Figure 1:
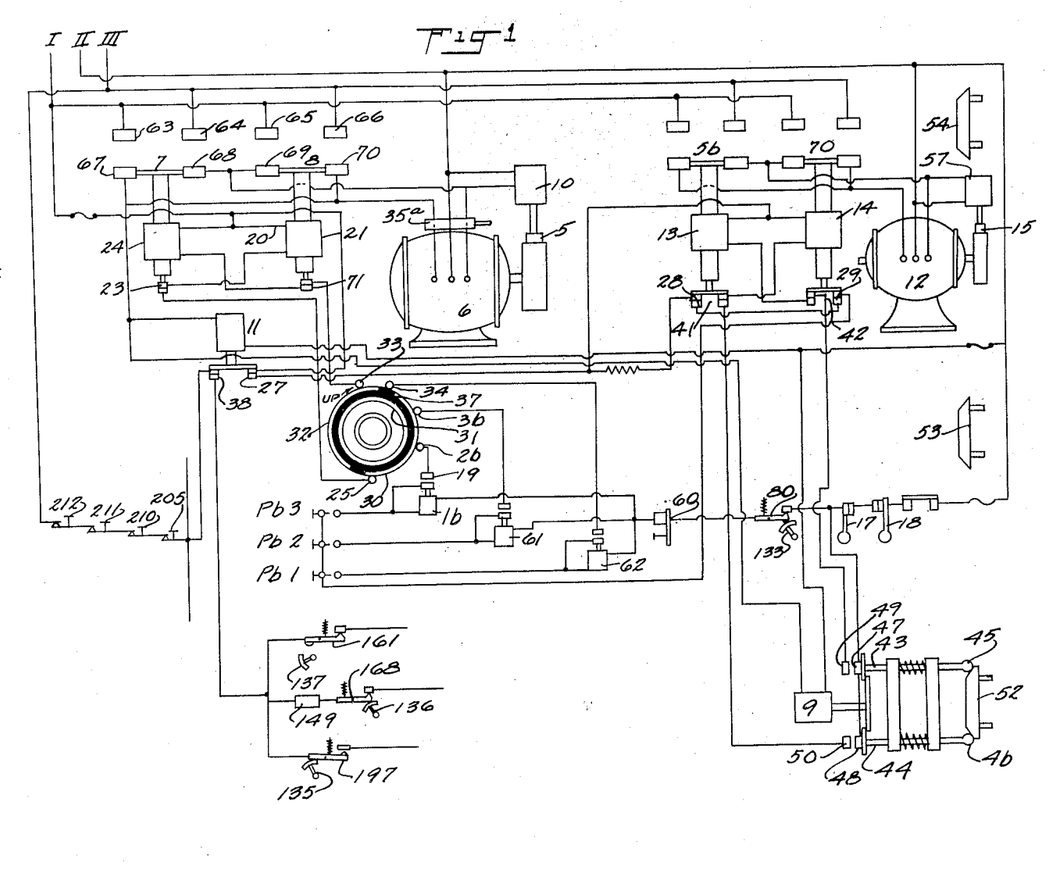
Fig. 1 is a diagram of the main and auxiliary motor circuits.

Referring to Fig. 1, I, II and III are the alternating current leads. The lead II is connected directly to the motor 6. Leads I and III pass through the reversing switches 7 and 8 for reversing the direction of rotation. When the switch 8 is closed, the motor is rotated in the "up" direction. A shunt across mains I and II is provided by which the brake magnet 10 is energized and also the magnets 9 and 11 so long as the switch 8 is closed. The energization of the brake magnet lifts the brake and the motor runs. The operation of the magnets 9 and 11 will be later described.

Figures 3, 4:
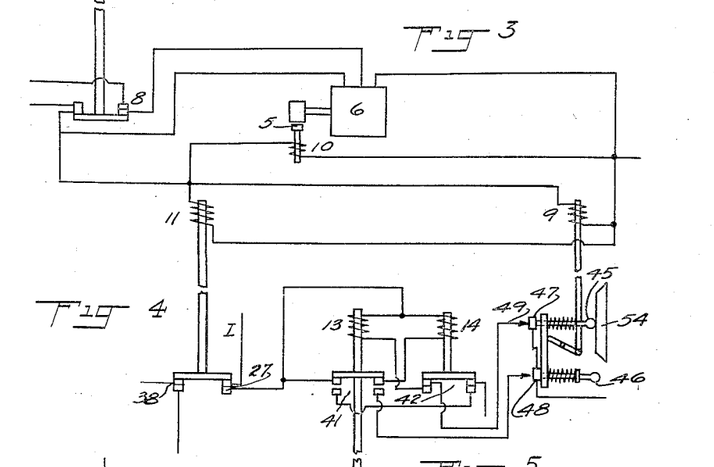
Figures 3A, 5:
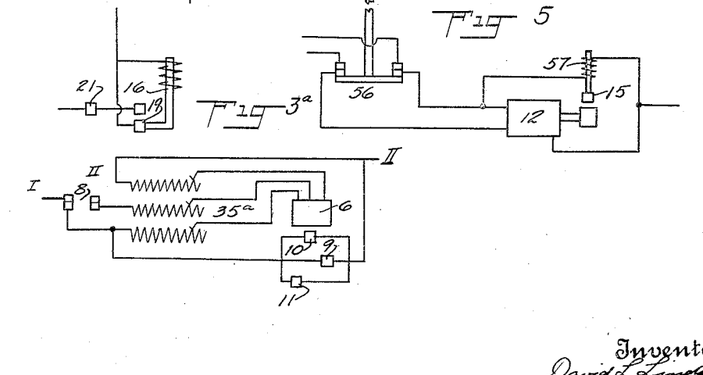
Figure 9:
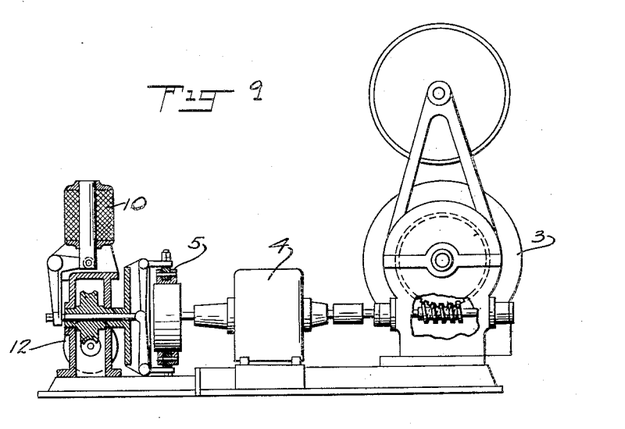
Figs. 9, 10 and 11 are detail views.

In case it is desired that the car shall be automatically leveled, an auxiliary hoisting mechanism may be employed, which in this embodiment of our invention is a so-called "micro" motor 12 wound to run at such speed as will move the car slowly only in bringing it to the proper level in either direction. In Figs. 1 and 5 this is shown connected to the leads through the reversing switches 13, 14 later to be described. It is also provided with a magnetically controlled brake 15, which is lifted when the motor is to start. Preferably the main motor brake 5 is rotated by the "micro" motor 12 and is so shown in Fig. 9.

Figure 8:
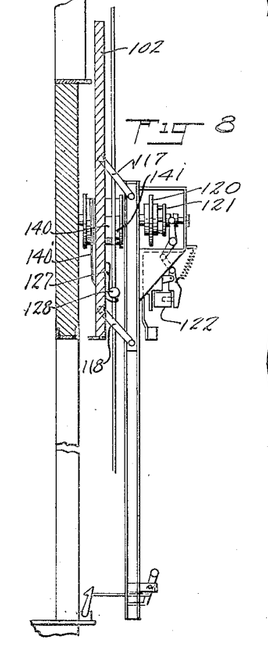

Referring now to Fig. 8, and assuming that the elevator is at rest at the lower floor with all gates closed, the parts are then as indicated in full lines.

If it is desired to send the elevator to the third floor, the dispatcher presses his button p.b.3 corresponding to that floor. This closes the circuit (see diagram Fig. 2) through the closed contacts 27—29 of switches 11; 13 and 14, dispatcher's button p.b.3, setting magnet 16, emergency button 60 in the car, master interlock switch 80, "limit stops" 17 and 18, to lead II. The energization of magnet 16 closes its switch 19, and a branch holding circuit (see Fig. 2) is then closed by wire 20 through magnet 21 of "up" reversing switch 8, back contacts 23 of magnet 24, the controller contacts 25, 26 and 30, back contacts 19 of magnet 16, through the magnet 16 and out. This branch circuit energizes magnet 21 and raises its switch 8 to its closed position shown in Fig. 3, thus energizing solenoid 10, lifting the main motor brake 5, starting the main hoisting motor 6 in operation and also energizing magnets 9 and 11. The branch circuit remains closed until broken as hereafter described, and keeps the setting magnet 16 energized, holding the branch circuit closed until broken by the controller 31, and therefore keeps switch 8 closed and magnet 11 energized. When this magnet 11 is energized, it opens its switch 27 shown in Figs. 2 and 4, and holds it open until the magnet 11 is deenergized, thus cutting out the dispatcher's buttons from further control of the operation until switch 11 is again closed.

An ordinary hand controller 35$^a$ is indicated in Fig. 1 and also in Fig. 3$^a$, which may be used to regulate the starting, stopping and speed of the elevator in the ordinary manner, but we prefer and have illustrated in the present embodiment a controller which will automatically stop the elevator at the floor desired. For the purpose of clarity in illustration, we have omitted the rheostats or other devices for automatically accelerating the speed at the start and automatically slowing down the speed as the elevator approaches the floor at which it is to stop. The automatic floor controller 31, 32 etc. is indicated diagrammatically in Fig. 1. This consists of a drum 31 rotated by suitable connection to the hoisting mechanism, on which are mounted the contacts 30 and 32 separated by insulated portions, as indicated. The brush contacts 25, 26, 33, 34 and 36 are stationary.

Figure 1A:
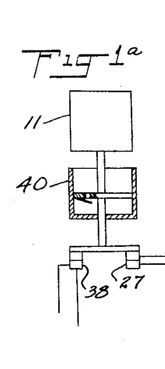

As the car travels up the hatchway, the controller drum rotates in the "up" direction indicated, until the insulation 37 passes under the brush 26. The branch holding circuit is thus broken (see also Fig. 2) deenergizing magnet 21 and opening the motor switch 8 (see Fig. 3) which cuts out the motor 6 and also deenergizes magnets 10, 11 and 9, the former immediately applying the brake to the motor, slowing it down and then holding it fixed with relation to the brake. It also deenergizes magnet 16 and drops its switch 19 to the open position indicated in Fig. 2. The deenergization of magnet 11 allows its plunger to fall. Its switches 27 and 38 are, however, not closed immediately, as a dash-pot 40 (Fig. 1ª) has been interposed in order to prevent the switch from closing until the main hoisting motor 6, and consequently the car, has slowed down.

The auxiliary hoisting mechanism for automatically bringing the car level with the floor landing includes a so-called "micro" motor 12, which moves the car slowly only. In order automatically to control this motor, we have provided a reversing switch mechanism, part of which is carried on the car and part in the hatchway, which will automatically cause the micromotor to come into operation and move the car in either direction necessary, if the car does not stop with its floor exactly level with the landing floor. As indicated in Fig. 1 and diagrammatically in Fig. 4, 41 and 42 are reversing switches controlled by solenoids 13 and 14. That portion of the leveling switch mechanism carried on the car comprises two plungers 43, 44 springpressed toward the right, each of which carries at one end a roller 45 (or 46) and at the other end contacts 47 (or 48). 49 and 50 are stationary contacts also carried on the car. Magnet 9, so long as it is energized, pulls the plungers to the left in Fig. 1 (diagrammatically indicated in Fig. 4) until the contacts 47 and 48 are in engagement with contacts 49 and 50 connected with the solenoids 13 and 14. While the main motor 6 is operating, the circuits are closed at these points 41 and 42 but no electricity passes because (see Figs. 3 and 4) magnet 11 remains energized and therefore its switch remains open. When the main motor is cut out or its current materially reduced, magnets 9 and 11 are deenergized. On account of the delay due to the dash-pot 40, magnet 9 releases the leveling switch plungers, therefore opening the contacts 47 and 48 before the switch 27 of magnet 11 closes. So long as magnet 9 is energized, the rollers 45 and 46 pass up and down without striking the cams 52—54, but when released move back to the position indicated in Fig. 1. They will take this exact position if the car floor stops exactly level with the landing floor. If, however, as is usually the case, the former is somewhat above or below the landing floor, one of the rollers will not be on the cut-away portion of the cam but will be on the face of one of the cams, depending on whether the car is above or below the floor. If the car stops below the level, this roller 45 will thus be moved by the cam to close the switch. A circuit will then be closed (see Fig. 4) through the magnet 13, switch 42 and contacts 49, 47.

Referring to Fig. 5, this will close the "micro" motor circuit at switch 56, lifting its brake 15 and causing the motor to rotate and move the car in the up direction. As the car floor comes exactly level with the landing floor, the roller 45 will travel off the operating face of the cam 52 and be restored to the position indicated in Fig. 1, thus breaking the circuit through magnet 13 of the "micro" motor reversing switch 56 opening the switch, and thus cutting out the "micro" motor and applying its brake. If the car drops or rises from the exact level, due to "creeping," stretching of the cables due to the entrance into the car of a heavy weight such as a truck or many passengers, slipping of the brake, or otherwise, one of the rollers of the "micro" motor leveling switch will be moved by the cam and therefore close its proper reversing switch, which will then again energize the "micro" motor and restore the car to its level.

It will be observed that the "micro" motor does not come into operation until the car has slowed down to stop at a floor, and in the present embodiment not until after the main hoisting motor 6 has been cut out. Furthermore, the micro-motor is not brought into operation unless the car floor is within a short predetermined distance (say 8 inches) of the floor landing, for if it is in any other position above or below such point, the cam will not contact with a roller and the reversing switch of the "micro" motor will not be closed. Both leveling switches will be kept by magnet 9 in closed position so long as the current is on motor 6; but, as magnet 11 holds its switch open, the micro-motor switch 56 will not be closed. Therefore, the "micro" motor will not come into operation in any case unless the car has slowed down to stop at a landing and is within a short predetermined distance of it.

Figure 2:
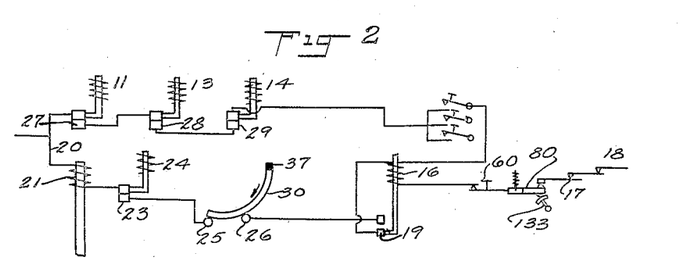
Figure 12:
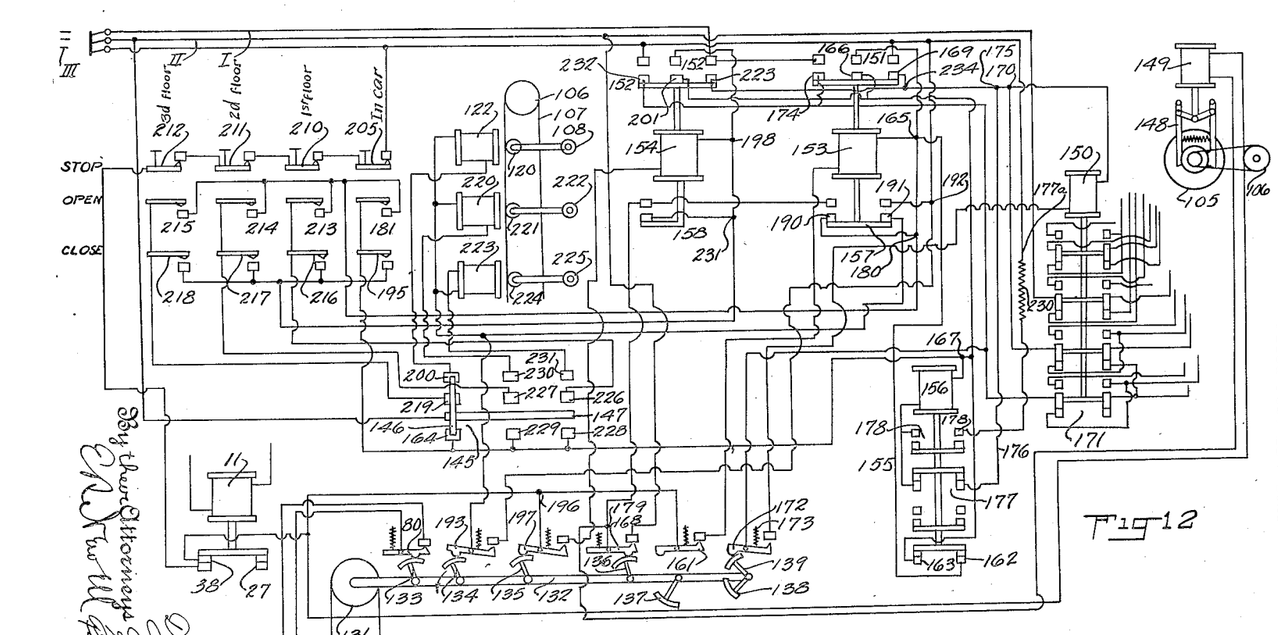
Fig. 12 is a diagram of the gate controlling circuits.

The car is, therefore, in this embodiment sent to and stopped exactly level with the floor, automatically and without the necessity of anything being done by the operator. If, however, the operator for any reason desires to stop the car before it reaches the intended landing, he may do so by pressing his stop button 60. A master interlock switch, in Figs. 1, 2 and 12, is opened as soon as any gate starts to open, as will be later described, so that it is impossible to start the main motor until all the doors of that hatchway have been closed.

It will be observed from Fig. 3 that the magnet 11 remains energized until the current is substantially cut off from the main motor 6. Consequently, even though the car should, intentionally or otherwise, be caused to run slowly past a floor where it has not intended to stop, the micro motor would not be cut in and the switch 38 controlling the gate-opening mechanism would not be closed. Also the gate-operating mechanism at the floor where the car is to stop, and the micro motor, will not be operated until the car has materially slowed down.

It is obvious that some of the above features, such as the automatic leveling of the car, are applicable to the ordinary elevator in which the control of the car is not automatic but is in the hands of an operator on the car.

Figure 6:
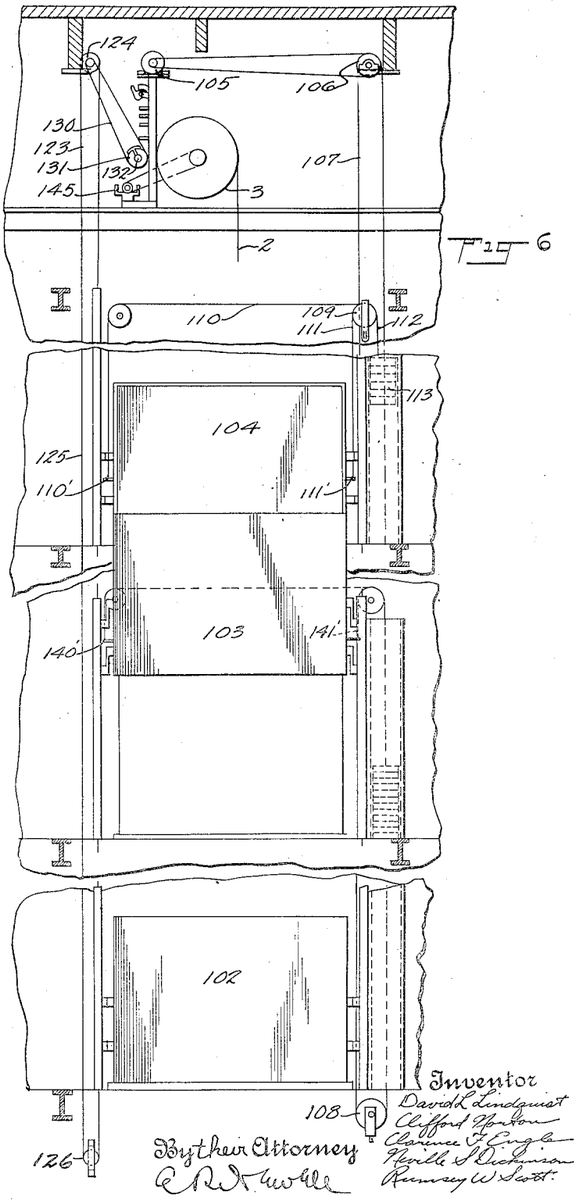
Fig. 6 is an elevation of a hatchway provided with three doors.
Figure 7:
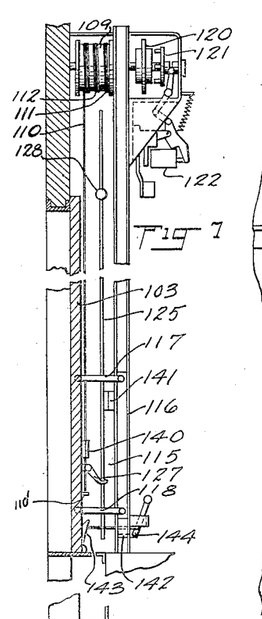
Figs. 7 and 8 are side views of doors in closed and open position respectively.

The elevator hatchway shown in Fig. 6 is provided with gates 102, 103 and 104. Each gate, and that part of the gate operating mechanism which is individual to the particular floor, is a duplicate of that of the other gates. Instead of providing a separate motor mechanism for each gate, we prefer to provide a source of power which is common to all the gates. In the present instance, we have provided on the overhead a gate motor 105, which drives a sprocket 106, around which passes an endless chain 107 provided with a weighted pulley 108 for keeping it taut. As shown in Fig. 7, the gate 103 is normally unconnected with the motor 105 but may be connected with it so that the gate may be opened or shut. This may be accomplished in various ways. In the preferred embodiment of our invention, at each floor is located a winding drum 109. Around this drum are wound two cables 110 and 111, the former connected to one side of the gate, and the other to the other side, as indicated. Another cable 112 is wound around the drum and attached to a counter-weight 113, which is substantially the same but preferably a trifle less in weight than the gate. When the drum is rotated, the gate will be raised.

In order that the gate may slide up past the gate on the floor above, if necessary, it is provided with a construction by which it will "offset" before it starts materially to rise. As seen in Fig. 7, the gate 103 is shut. 115 is a slide operating in a guideway 116, which is connected to the gate by two links 117 and 118. When the lifting cables are pulled, the gate will rise slightly, and, because of the friction between the slide 115 and its guide, will move bodily sidewise or offset to the position indicated in Fig. 8 of the gate 102 so that it will when raised clear the gate of the floor above.

The drum 109 has loose on its shaft a sprocket 120. 121 represents a clutch portion slidable on but not rotatable of the drum shaft. When this clutch portion is forced to the left into engagement with the sprocket 120, it will obviously clutch the drum and cause the gate to be operated through the gate-driving chain 107. The clutch is preferably operated by a suitable solenoid 122 as indicated.

We have provided a mechanism by which the gates themselves, after they are started in operation, control their own operation and the speed of the gate motor; specifically this includes in the present embodiment a chain 123 passing around a sprocket 124, and a tape or other flexible connection 125 which passes down the hatch and around an idler sheave 126, thus forming a substantially endless but somewhat flexible connection. As seen in Fig. 7, each gate is provided with a pivoted projection 127 which embraces the tape 125. At each floor a button or stop 128 is provided fixed to the tape. Therefore, when any gate is raised, it carries the button and tape with it (see Fig. 8) and therefore rotates the sprocket 124. Driven by the sprocket 124 is a chain 130 which passes around a sprocket 131 which operates a selector or "knock out" device. This comprises a shaft 132 on which are mounted a series of cams 133 to 139 (see Fig. 12). As the gate rises, the cams are rotated in the direction indicated by the arrow in Fig. 12 and in the reverse direction when the gate descends. This selector opens and closes various circuits hereafter to be described.

As the gate offsets to the position indicated in Fig. 8, two blocks 140 on the gate and 141 on the slide engage. The stops 128 are heavy enough so that, when gate descends, the weight of the stops will carry the tape downward, keeping the stop against the projection 127.

As the gate descends, it pushes down the slide 115 until it strikes the bumper 142 where it is arrested. Further slacking away of the gate cables will then cause the gate to offset back to its normal position. It may there be locked by a catch 143 connected to a pivoted arm 144 which may be operated by a cam on the car as the car approaches the floor.

145 (Figs. 6 and 10) indicates a commutator selector driven by connections to the hoisting drum 3, which makes and breaks certain of the electric circuits at the proper times. This commutator may be of any approved form, but that illustrated in Fig.

Figure 10:
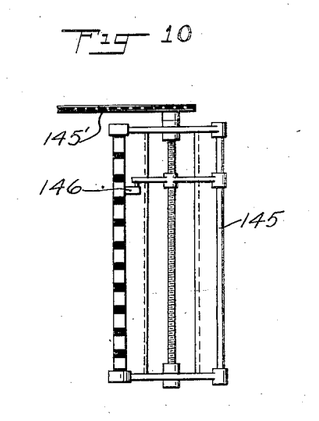
Figure 11:
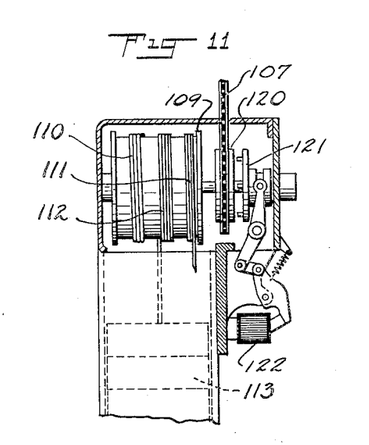
Figure 14:
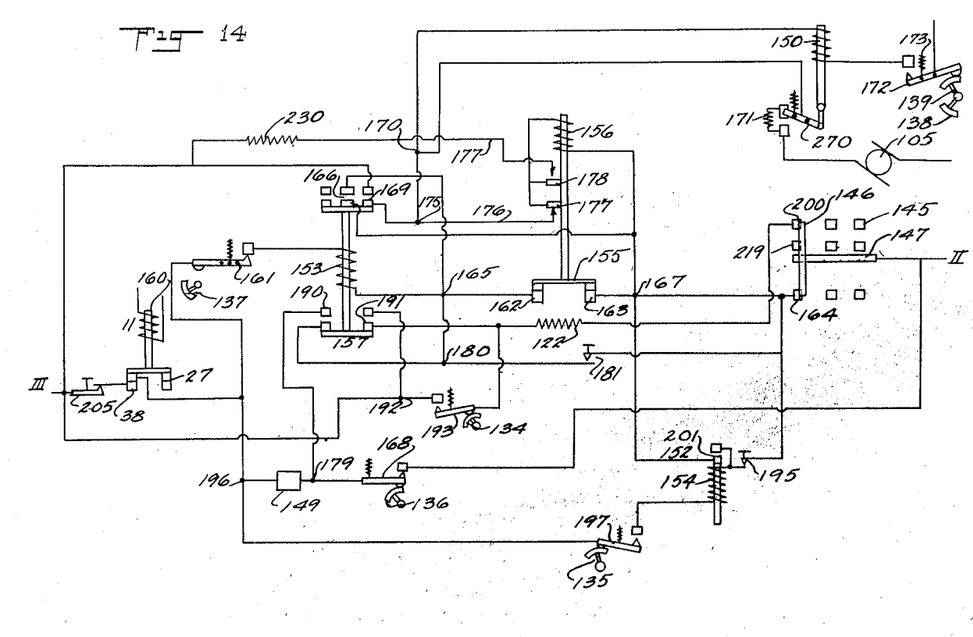
Fig. 14 is a simplified diagram of the gate controlling circuits.

10 is preferable, in which a brush 146 travels over suitable contacts, the brush traveling correspondingly with the car. Fig. 12 shows an electric diagram of the electric circuits for operating the gates. Fig. 14 is a more simplified diagram, the parts being similarly lettered. In Fig. 12, the gate motor 105 is provided with a brake 148 operated by a solenoid 149. The motor is preferably wound so that two speeds may be obtained by the switch mechanism 150, as more fully set forth and claimed in an application, Serial No. 132,393, filed November 20, 1916, by Jacob B. Lewis and therefore not specifically illustrated. Other means of obtaining the variation in speed of the motor may be provided, and in Fig. 14 we have illustrated a simple means for accomplishing this result.

The motor is driven in the proper direction to open or close the gates by the switches indicated as a whole by 151 and 152, the former driving it in the gate "opening" and the latter in the "closing" direction. These switches may be closed by energization of solenoids 153 and 154. An automatic relay or switch, indicated as a whole by 155, is provided, operated by a solenoid 156. The solenoids 153 and 154 also operate switches which are indicated as a whole by 157 and 158.

Referring now to the simplified diagram, Fig. 14, as the car approaches the floor at which it is to stop, the main hoisting motor 6 (Fig. 1) is cut out. This deenergizes the controlling solenoid 11, which allows its core 160 to drop (retarded somewhat by the dash-pot) and close the contacts 38. The elevator car has moved the brush 146 substantially to the position shown in Fig. 14. A circuit may then be traced from switch 38 to arm 161, through the solenoid 153, through the switch contacts 162 and 163, to the third floor stationary contact block 164 of the commutator, and out by way of the brush 146 and feed strip 147. This energizes the solenoid 153 of the "Open" reversing switch and closes both switches 151 and 157. As the switch contacts 162 and 163 will be opened as later explained, which would deenergize the solenoid, a holding circuit is provided which is closed when switch 151 closes. This may be traced from the junction 165, through the contact box 166, through the junction 167 which forms a shunt around the switch 162, 163.

The brake 148 of the gate motor 105, Fig. 8, has been lifted, as its solenoid 149 is energized immediately on the closure of the switch 38. This circuit may be traced through the solenoid, pivoted arm 168 and out. The motor circuit is also closed when switch 151 closes. In the wiring diagram of Fig. 12, this may be traced from the lead 3 to the junction 170 and through the contacts 171 of the two-speed switch. In the simplified diagram, Fig. 14, this may be traced through the contacts 169, through the arm 270 and resistance 171. The motor will therefore rotate at slow speed and start the gate to open. The gate will be moved slowly while it is offsetting, as the motor is then running at slow speed. As soon as the offsetting has been completed, the cam 139 passes off from its pivoted and spring-pressed lever 172, allowing the spring 173 to close the switch at this point. A circuit may then be traced through the contacts 169, the junction 170, through the solenoid 150, and out. This will energize the solenoid, move its switch 270, cutting out resistance 171 and causing the motor to run at an increased speed, consequently moving the gate with greater rapidity. The same circuit may be traced in the more complete diagram of Fig. 12.

Simultaneously with closing switch 151, a circuit is closed to energize the solenoid 156 of the door-opening relay. This may be traced from the junction 175 by wire 176, through the switch contacts 177, through the solenoid 156, and out through the commutator. This will energize the door-opening relay solenoid 156 and open the switch 162, 163. A holding circuit is provided to keep this relay energized, which may be traced from the lead III, through wire 177ᵃ, switch contacts 178, to and through the solenoid which will obviously remain energized until the brush 146 passes off from the contact block 164, that is, until the car starts to move away from the floor. This is desirable in order to prevent the door from reopening automatically after the door has closed, as will be later described.

As the door starts to open, the cam 136 will soon release its switch 168. This will open the circuit of the brake solenoid 149, but a holding circuit is provided which may be traced from the junction 179, through the left-hand contact blocks of switch 157, to the junction 180. From this point lead two parallel circuits, one through the normally "Open" button 181 and out through the commutator, and the other from the junction 180, through the contacts 166 of the "Open" reversing switch 151, to the junction 167 and out through the commutator. This will hold the brake solenoid energized until switch 151 opens.

Figure 13:
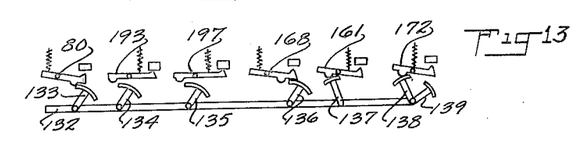
Fig. 13 is an illustration of the cams when a gate is fully open.

As the door approaches its upward limit of travel, the cam 138 strikes the switch arm 172 and reopens its switch, as indicated in Fig. 13. This deenergizes solenoid 150 of the two-speed switch and so shifts the connections of the motor as to bring it again to slow speed. In the simplified diagram, Fig. 14, this is done by cutting in the resistance 171, as shown. As the door reaches its upward limit of travel, the cam 137 strikes its spring-held lever 161 and opens this switch, as indicated in Fig. 13. This will break the circuit through the solenoid 153 of the "Open" reversing switch, and allows switches 151 and 157 to open. This will break the motor circuit at contacts 169, stopping the motor and at the same time break the holding circuit of the brake solenoid 149, for contacts 190 will be separated, thus reapplying the brake 148 to the motor. This will also break, at the contacts 191, the initial energizing circuit of the gate clutch solenoid 122. But it is desirable that the gate be positively held open, especially as it is desirable to have the doors slightly under counter-weighted, and if the door were free to close it might slide shut, so we have provided a circuit to hold the gate clutch solenoid energized and the gate therefore braked by the motor brake. This holding circuit may be traced from the lead III, through the junction 192, through the switch arm 193 which has been allowed to close soon after the gate started to open, and remains closed when the gate is fully opened (see Fig. 13), because its cam 134 does not meet it. This branch circuit remains closed until the gate reaches its substantially closed position.

When the gate is fully open, the parts (except for the cams and their switches) have been restored to the position indicated in Fig. 14, excepting further that the door-opening relay solenoid 156 is still energized. If it is then desired to close the door, the "Close" button 195 in the car may be operated. This will close a circuit (see Figs. 12 and 14) which may be traced from the switch 38, to the junction 196, to the switch 197 (then closed), through the solenoid 154 of the "Close" reversing switch 152 to the junction 198 of Fig. 12, through the button 195, and out through the commutator. This will close switch 152, closing circuits substantially similar to the opening operation, except that the motor is driven in the opposite direction so as to positively drive the gate downward, at first at slow speed and then at increased speed.

Somewhat before the slide 115 (Fig. 7) strikes the bumper 142, cam 139 reengages its switch lever 172, deenergizing solenoid 150 and causing the motor again to operate at slow speed, while the door is offsetting to its closed position. As the door reaches its closed position, cam 135 engages its switch lever 197, reopening its switch 152 because the holding circuit shunt around push-button 195 is broken at the contacts 201.

The parts are thus restored to the position indicated in Fig. 12, except that the solenoid 156 of the door-opening relay is still energized. If this were not so, the door would immediately open after having been closed. This solenoid 156 is not deenergized until the car moves away from the floor and thus moves brush 146 off from the contact 164.

The "Open" and "Close" buttons 181 and 195 are located in the car. In the car is also a "Stop" button 205, by which the movement of the gate in either direction may be arrested at any instant. Operation of this "Stop" button 205 opens the circuit of whichever reversing switch solenoid has been energized and restores the parts to the condition they are when the gate is fully opened. Such emergency stopping of the gate is desirable at times. The gate may then be opened by operation of the "Open" button 181 or closed by operation of the "Close" button 195.

We have provided a so-called "master interlock" which is operated by each of the gates and which automatically renders the main hoisting motor inoperable and cuts the despatcher's buttons out of control, after any gate has started to open. As seen in Figs. 1, 2 and 12, the controlling circuits pass through the switch 80 which is kept closed by the cam 133 so long as the gates are closed, but is allowed to open as soon as any gate moves upward. This mechanism renders it impossible to move the car by the main hoisting motor unless all the gates are closed, but does not interfere with the automatic operation of the micro-leveling mechanism, which latter automatically levels the car and maintains it level even though a gate may be operated.

The normally closed "Stop" buttons 210, 211 and 212, the normally "Open" buttons 213, 214 and 215, and the normally "Close" buttons 216, 217 and 218 may, if desired, be provided on the floors, one set such as 210, 213 and 216 at each floor, so that a person on the floor and outside the car may operate the gates. The "Open" and "Close" buttons on the floors will, however, not control any gate unless the car is at that floor. For example, the buttons 215 and 218 are connected to the contact block 219 of the commutator, but no circuit can be closed through it until the brush 146 touches it, which it does not do until the car is within the micro-leveling zone say 8 inches, of the floor at which the buttons are located.

220 is the gate clutch magnet; 221 the chain sprocket, and 222 the gate cable winding drum for the second floor, and 223, 224 and 225 the similar parts for the first floor.

It will be observed that the switch 38 controls the door operation and switch 27 the micro-motor. This switch is controlled by its solenoid 11 which in turn is controlled by the controller of the car. This double switch 27, 38 is not closed until after the car has been slowed down to stop at a floor, and in the present embodiment not until the main hoisting motor has been substantially cut out. It will also be observed that through the action of the commutator or floor selector 145 operated by the main hoisting drum 3, the gate operating mechanism is controlled in part by the car, that is, its position in the hatchway.

In the present embodiment of our invention, the car cannot be started until all the gates are closed. It may then be caused to proceed to any desired floor. After it has reached that floor, or is within say 8 inches of it, and has been slowed down to stop, the gate at that floor only may be opened, automatically in the present instance. The micro-leveling motor and the gate-opening mechanism are cut in substantially simultaneously. While the car is being brought to a level, the gate is opened, so that when the car floor is at its proper level the gate is fully open or substantially so. The car cannot be moved by the main hoisting motor while any gate is open, but will automatically level itself at any time irrespective of whether the gate is open or shut. In this embodiment of our invention, the car controller also controls the micro motor and the gate-opening mechanism, and the gate-opening mechanism controls the main hoisting motor but not the micro leveling motor, nor is the gate-opening mechanism controlled by the micro motor.

It is obvious that many variations from the foregoing preferred embodiment may be made without departing from the scope of our invention as claimed. We therefore do not intend to limit ourselves to the particular parts, arrangement or method of operation specifically described and illustrated.

The gate-handling mechanism per se is not claimed herein, as it forms the subject matter of a separate application by Clifford Norton, Neville S. Dickinson, and Rumsey W. Scott, Serial No. 465,906, filed April 30, 1921.

What we claim as new is:

1. In combination, an elevator hatchway, a gate at each floor, a car, hoisting means, automatically operating car leveling mechanism operable only when said cars is within the micro-zone of a floor, and gate opening mechanism arranged to open only the gate of the floor at which the car is within the operating zone of said leveling mechanism and automatically operable throughout substantially said zone.

2. In combination, an elevator hatchway, a gate at each floor, automatically-operating car leveling mechanism operable only when said car is within the micro-zone of a floor, and mechanism, controlled by cutting out the main hoisting means, and arrange to start the car-leveling mechanism in operation without attention from the operator, and gate-opening mechanism arranged to open only the gate of the floor at which the car is within the operating zone of said leveling mechanism, and automatically operable throughout substantially said zone.

3. In combination, a car, a motor for moving the car, a controller for the same, a gate, gate-operating mechanism, means controlled by the gate mechanism rendering the motor inoperative after the gate starts to open, automatic car-leveling mechanism, and means arranged to start the car-leveling mechanism and the gate-operating mechanism in operation substantially simultaneously and at substantially any point in the zone of operation of the car-leveling mechanism.

4. In combination, a car, a motor for moving the car, a controller for the same, a gate, gate-operating mechanism, means controlled by the gate mechanism rendering the motor inoperative after the gate starts to open, automatic car-leveling mechanism, and means controlled by the controller of the motor and arranged to start the car-leveling mechanism and the gate-operating mechanism in operation substantially simultaneously and at substantially any point in the zone of operation of the car-leveling mechanism.

5. In combination, a car, hoisting mechanism for the same, automatic leveling means for the car, gate mechanism, a controller controlling all the foregoing elements, and means constructed and arranged so that the gate mechanism controls the car but does not control and is not controlled by the leveling mechanism.

6. In combination, a hatchway having floor landings, a car, a hoisting motor and means to cut out the same, means to level the car automatically and operable only when the car is within a zone extending a short distance on each side of any floor, gate-opening mechanism at each floor, and means rendering the same operable throughout, and normally only when the car is within, a similar zone at that floor, and mechanism rendering both gate-opening and car-leveling mechanisms normally operative only after the said hoisting motor has been substantially cut out.

7. In combination, a hatchway having floor landing, a car, a hoisting motor and means to cut out the same, means to level the car automatically and operable only when the car is within a zone extending a short distance on each side of any floor, gate-opening mechanism at each floor, and means causing the same automatically to operate throughout, and normally only when the car is within, a similar zone at that floor, and mechanism rendering both gate-opening and car-leveling mechanisms normally operative only after the said hoisting motor has been substantially cut out.

8. In combination, a hatchway, a gate at each floor, a car and hoisting means, car leveling mechanism operating whereby when started within a micro-zone on either side of a floor it will automatically level the car, gate-opening mechanism operable independently of the car-leveling mechanism, selecting mechanism arranged to render said car leveling and gate-opening mechanisms normally operable only when the car is substantially within the micro-zone, and mechanism arranged to start said car-leveling and gate-opening mechanisms in operation substantially simultaneously and substantially at any point in the micro-zone at which the car stops.

9. In combination, a hatchway, a gate at each floor, a car and hoisting means, car leveling mechanism automatically operating whereby when started within a micro-zone on either side of a floor it will level the car, gate-opening mechanism operable independently of the car leveling mechanism, selecting mechanism arranged to render said car leveling and gate-opening mechanisms normally operable only when the car is within the micro-zone, and mechanism under control of the car operator and arranged to start said car leveling and gate-opening mechanisms in operation substantially simultaneously and substantially at any point in the micro-zone at which the car stops.

10. In combination, a car, a hoisting motor and means to cut out the same, automatically-operating car-leveling mechanism, automatically-operating gate-opening mechanism, including gate mechanism at each of three or more floors, said gate-opening mechanism arranged to open only the gate of the floor to which the car is adjacent, a controller rendering the gate-opening and car-leveling mechanisms automatically operative when and only after said hoisting motor has been substantially cut out, means thereafter rendering the car-leveling mechanism operative whenever and only when the car is a short distance from a floor in either direction, and means also rendering the gate-opening mechanism operative wherever the car is throughout a similar zone.

11. In combination, a car, hoisting means for the same, automatic car-leveling means, gate mechanism, a controller for cutting out the hoisting means, and means controlled by said controller and controlling both the leveling means and gate mechanism whereby they are automatically operative independently at different times and also simultaneously.

12. In combination, a hatchway having several floors, a car and hoisting mechanism, car leveling mechanism and gate-opening mechanism, mechanism controlling the operation of both and controlled by stopping the car at any floor, and selecting mechanism causing the car leveling and gate-opening mechanisms to operate without attention from the car operator and only when the car is within a micro-zone on either side of the floor.

13. In an elevator of the push button type in which the car automatically stops at the desired floor, combined with a hatchway, a gate at each floor, a car and hoisting means, car leveling mechanism automatically operating whereby when started within a micro-zone on either side of a floor it will level the car, gate-opening mechanism operable independently of the car leveling mechanism, selecting mechanism arranged to render said car leveling and gate-opening mechanisms normally operable only when the car is within the micro-zone, and mechanism arranged to start said car leveling and gate-opening mechanisms in operation substantially simultaneously and substantially at any point in the micro-zone at which the car stops.

14. In combination, a car, a hoisting motor, automatic leveling mechanism, gate-operating mechanism, means controlling the two latter elements and controlled by cutting out the hoisting motor, and means controlled by the position of the car and controlling said leveling and gate-operating mechanisms independently.

Dated this 31st day of January, 1921.

DAVID L. LINDQUIST.
CLIFFORD NORTON.
CLARENCE F. ENGLE.
NEVILLE S. DICKINSON.
RUMSEY W. SCOTT.